July 17, 1962
R. C. SANGSTER
3,044,491
MULTIPORT SWITCHING VALVE
Filed July 29, 1958
2 Sheets-Sheet 1
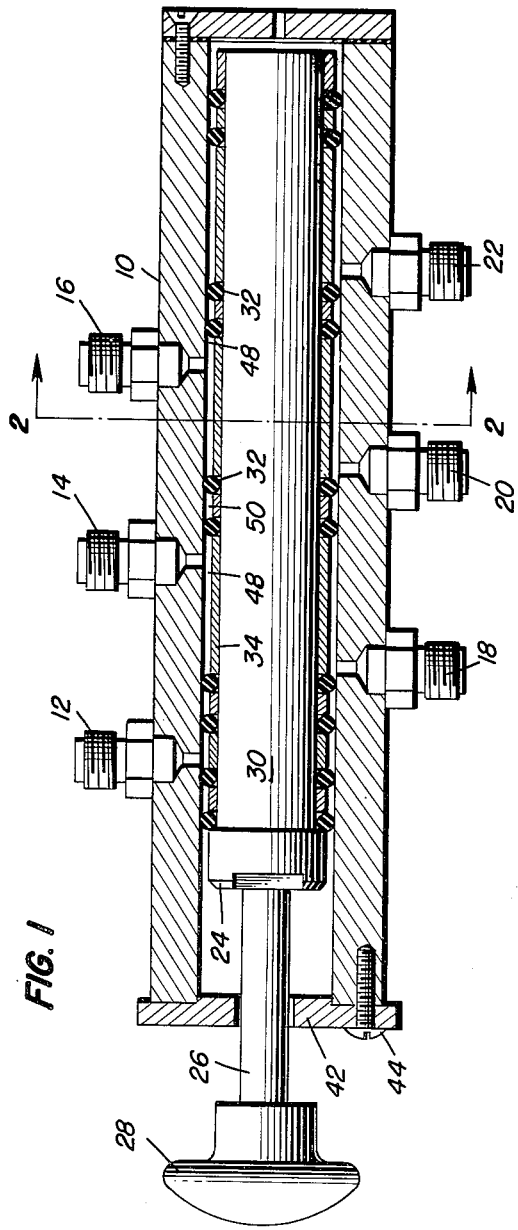
FIG. I
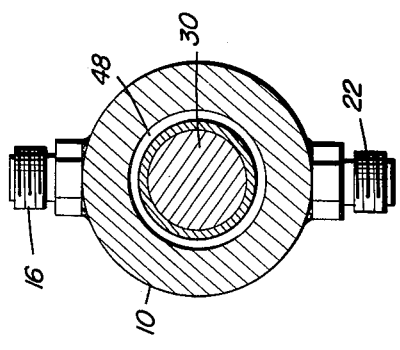
FIG. 2
INVENTOR
Raymond C. Sangster
BY *Stevens, Davis, Miller & Mosher*
ATTORNEY July 17, 1962 R. C. SANGSTER 3,044,491
MULTIPORT SWITCHING VALVE Filed July 29, 1958 2 Sheets-Sheet 2

INVENTOR
Raymond C. Sangster
BY Stevens, Davis, Miller + Mosher
ATTORNEY

Patent 3,044,491 — Multiport Switching Valve

3,044,491
MULTIPORT SWITCHING VALVE
Raymond C. Sangster, Dallas, Tex., assignor to Texas Instruments Incorporated, Dallas, Tex., a corporation of Delaware
Filed July 29, 1958, Ser. No. 751,792
2 Claims. (Cl. 137—625.18)

This invention relates to a multiport valve, and more particularly, to a multiport valve for switching a plurality of fluid streams in such a way that the ports are maintained sealed during switching to prevent intermixing and undesired interconnections between the various fluid streams being switched.

Valve constructions are known which have means for simultaneously interconnecting a plurality of fluid ports via a valve body to establish a predetermined relationship between the plurality of fluid streams and for switching the connection when desired to establish a different relationship. In certain applications using this type of valve, for example, in the switching of high purity gas streams, it is a requisite that separate fluids do not intermix when the various fluid connections are switched. Although prior art constructions have attempted to meet this requirement, they have not been completely successful. Accordingly, it is a primary object of this invention to provide a multiport fluid switching valve having an improved sealing construction which will prevent interconnections during switching of a plurality of fluid streams.

It is another object of this invention to provide a fluid switching valve having a valve body with a plurality of inlets and a plurality of outlets, a movable fluid switching member having a construction such that the fluid inlets may be connected to separate fluid outlets for stream switching or the valve may be positioned in an off position with none of said inlets connected to the outlets.

It is an additional object of this invention to provide an improved sealing construction utilizing O-ring seals constructed of polytetrafluoroethylene, or a similar material that does not require lubrication, the rings being positioned to provide wide and narrow annular passages for switching and sealing separate fluid streams.

Other objects and advantages of this invention will be apparent from the following detailed description taken in connection with the accompanying drawings which disclose, by way of example, the principle of the invention and the best mode which has been contemplated of applying that principle.

In the drawings:

FIGURE 1 is a side sectional elevation of a 6-port fluid switching valve embodying the principles of this invention;

FIGURE 2 is a sectional view taken along line 2—2 of FIGURE 1;

Figure 3:
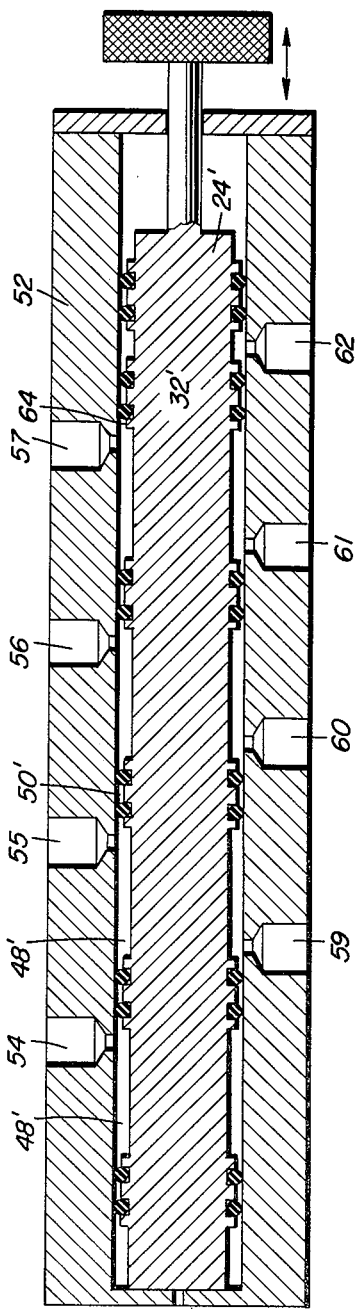
FIGURE 3 is a schematic view illustrating the principles of this invention applied to an 8-port valve and also illustrating a modification in the construction of the valve switching member.
Figure 4:
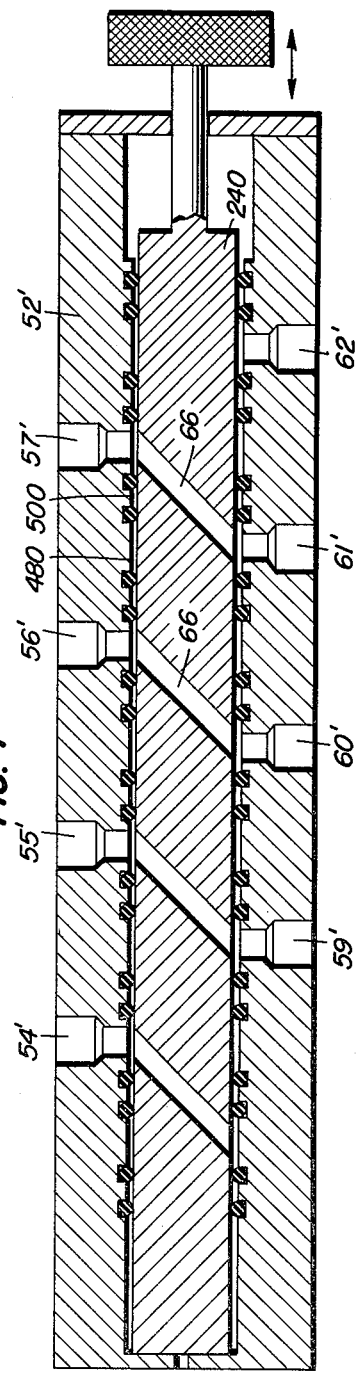
FIGURE 4 is a schematic illustration of an 8-port switching valve illustrating another modification in the sealing means and construction of the switching member.

Briefly, this invention contemplates a valve body having a plurality of inlets and a plurality of outlets for selectively switching a plurality of fluid streams connected to the inlets. A fluid switching member is movable within the valve body to interconnect selectively at least some of the inlets to at least some of the outlets in one position, or to connect some of the inlets to others of the outlets. In an intermediate or "off" position of the member, all of the inlets are sealed from any of the outlets. A pair of spaced O-rings cooperating with the valve body and fluid switching member function as seals by providing separated annular spaces some of which may be used for fluid switching while others are used for fluid sealing. In the embodiment illustrated in FIGURES 1 and 2, the O-rings are positioned on a slidable member in a manner to provide wide and narrow annular spaces, the wide annular spaces being used for switching and the narrow annular spacing being used for sealing. The embodiment of FIGURE 3 is somewhat similar except in the manner of attaching the O-rings to the fluid switching member and the number of ports shown. In FIGURE 4 the O-rings are secured to the valve housing and are therefore stationary. The fluid switching member has angular holes therethrough which connect different inlet and outlet passages during translation of the fluid switching member. Intermediate the switching positions is an off position of the valve.

Referring more specifically to the drawings, FIGURE 1 shows a valve body 10 which is generally cylindrical and has one set of fluid connections 12, 14 and 16 and a second set of fluid connections 18, 20 and 22 axially staggered or interspaced between the connections of the first set. The valve includes a fluid switching member in the form of a slidable piston 24 having a piston rod extension 26 with an operating handle 28 attached thereto. The piston body 24 includes a section 30 of smaller outside diameter than the inside diameter of body 10. A plurality of spaced O-rings 32, of polytetrafluoroethylene or the like, are positioned on the portion 30 and these O-rings are of sufficient size to contact the inside diameter of body 10. The O-rings 32 are separated by annular spacers 34 which are a predetermined length. Spacers 34 are selected and positioned to provide a pair of annular O-rings 32 adjacent each fluid connection as shown in FIGURE 1. Also, a pair of O-rings 32 are located at the end of piston 24 remote from the handle 28. The O-rings create sealed wide and narrow annular passages 48 and 50. The chamber of body 10 is closed at one end by an apertured cover plate 36 and gasket 38 secured to the body 10 by suitable screw means 40. In the illustrated embodiment the valve may be closed at the opposite end by plug 42 attached to the valve body by screws 44. The valve may be mounted on a panel or any other suitable device and the operation may be manual by means of handle 28 or by any other suitable means such as an automatic operator.

In the operation of the valve shown in FIGURES 1 and 2, the O-rings 32 form wide and narrow annular passages 48 and 50 respectively. When in the position shown in FIGURE 1, fluid connection 12 is sealed off while fluid connection 14 is connected to fluid connection 18 and fluid connection 16 is connected to fluid connection 20 through anular spaces or passages 48. When the fluid switching member 24 is moved to the left, as viewed in FIGURE 1, a distance sufficient for the narrow annular passages 50 to straddle the inlet passages, the valve will be in its "off" position. When the fluid switching member 24 is moved further to the left as viewed in FIGURE 1, the annular switching passage 48 will move to allow fluid connection 12 to be in fluid communication with fluid connection 18 and in a similar manner fluid connections 14 and 16 will be connected to fluid connections 20 and 22, respectively. It can be seen from the foregoing that when a switching operation is desired the two sets of fluid connections are completely sealed off when switching from one position to the other, thereby preventing any intermixing or undesired inter-connection of the fluid streams. By constructing the O-rings of a material which requires no lubrication (polytetrafluoroethylene), there will be no lubricant intermixed with the fluid streams.

In the embodiment illustrated in FIGURE 3, an 8-port switching valve is illustrated. This valve has a body member 52 with one set of fluid connections 54, 55, 56 and 57 therein. The body member is also provided with another set of fluid connections 59, 60, 61 and 62, which are alternately axially staggered with the first set. The fluid switching member 24' is axially slidable therein. Positioned between projections 64 on the periphery of switching member 24' are a plurality of O-rings 32' forming a plurality of wide and narrow annular passages 48' and 50', respectively. The operation of the 8-way valve shown in FIGURE 3 is similar to the operation of the 6-way valve shown in FIGURE 1. With the valve in the position illustrated fluid connections 54 and 62 will be closed off and connections 55, 56 and 57 will be connected through annular passages 48' to connections 59, 60 and 61, respectively. When the fluid switching member 24' is moved to the right the narrow annular passage 50' will straddle all of the outlet connections simultaneously, thereby putting the valve in its "off" position. As the switching member 24' is moved further to the right all of the first set of fluid connections will be connected to all of the second set of fluid connections to provide different fluid paths from the position in the illustration, i.e., 54, 55, 56 and 57 will be in fluid communication with 59, 60, 61 and 62, respectively.

FIGURE 4 shows an 8-way valve having a body member 52' with one set of fluid connections 54', 55', 56' and 57' therein. The valve also has a second set of fluid connections 59', 60', 61' and 62' staggered between the first set of connections in a manner similar to that shown in FIGURE 3. The O-rings 320 are assembled within grooves 64' in the inner bore of body member 52'. These O-rings are again positioned in pairs to provide narrow annular passages and wide annular passages indicated by numerals 500 and 480, respectively. The fluid switching member 240 has a plurality of passages 66 therein at an angle to the axis thereof which passages establish fluid communication between connections 55' and 59', 56' and 60', and 57' and 61'. Connections 54' and 62' will be closed. The fluid switching member 240 is axially movable, thereby allowing displacement of passages 66. During movement of member 240, the valve passes to an "off" position similar to that described heretofore and upon additional axial movement passes to a second fluid switching position which is also similar to that described above. In this second switching position connections 54' through 57' are connected to connections 59' through 62', respectively with no intermixing of the fluid streams during switching.

Although there have been shown, described, and pointed out the fundamental novel features of the invention as applied to the illustrated embodiments, it will be understood that various omissions and substitutions and changes in the form and details of the device illustrated and its operation may be made by those skilled in the art without departing from the spirit of the invention. For example, any number of ports may be used; some ports may be blanked off, others interconnected externally; all to give a wide variety of fluid switching. It is the intention, therefore, to be limited only as indicated by the scope of the appended claims.

What is claimed is:
1. A valve for switching a plurality of fluid streams comprising:
(a) an elongated hollow valve body having a first set of ports and a second set of ports axially staggered therewith,
(b) an elongated fluid switching member axially slidable within said body to at least two fluid switching positions,
(c) a plurality of pairs of spaced O-rings mounted on said body between said body and said member, one of said pairs being positioned between each pair of adjacent ports,
(d) a plurality of passages defined within said member to interconnect a plurality of axially spaced points along said member with corresponding points spaced therefrom by distances substantially equal to the spacing between adjacent ports on said body,
(e) said member and said passages permitting fluid communication between the first set of ports and corresponding ports of the second set displaced in one axial direction in a first of said switching positions and corresponding ports of the second set displaced in the opposite axial direction in a second of said switching positions.

2. A valve for switching a plurality of fluid streams comprising:
(a) a hollow cylindrical valve body having a first set of ports and a second set of ports axially staggered therewith,
(b) a cylindrical fluid switching member axially slidable within said body to at least two fluid switching positions,
(c) a plurality of pairs of spaced O-rings mounted on said body between said body and said member, one of said pairs being positioned between each pair of adjacent ports,
(d) a plurality of passages defined within said member obliquely oriented with respect to the axis thereof, said passages interconnecting a plurality of axially spaced points along said member with corresponding points spaced therefrom by distances substantially equal to the spacing between adjacent ports on said body,
(e) said member and said passages permitting fluid communication between the first set of ports and corresponding ports of the second set displaced in one axial direction in a first of said switching positions and corresponding ports of the second set displaced in the opposite axial direction in a second of said switching positions,
(f) said passages being sealed off by said pairs of O-rings when said member is in an axial position intermediate said first and second switching positions.

References Cited in the file of this patent
UNITED STATES PATENTS

| | | |
|---|---|---|
| 1,145,128 | Ekonomov | July 6, 1915 |
| 1,231,733 | Haley | July 3, 1917 |
| 2,485,504 | Morgan | Oct. 18, 1949 |
| 2,524,142 | Seeloff | Oct. 3, 1950 |
| 2,577,999 | Christensen | Dec. 11, 1951 |
| 2,645,450 | Chessman | July 14, 1953 |
| 2,719,530 | Zibrun | Oct. 4, 1955 |
| 2,747,611 | Hewitt | May 29, 1956 |
| 2,837,374 | Lipman | June 3, 1958 |
| 2,858,851 | Holl | Nov. 4, 1958 |

FOREIGN PATENTS

| | | |
|---|---|---|
| 672,969 | Great Britain | May 28, 1952 |
| 64,738 | France | June 29, 1955 |

OTHER REFERENCES

Dupont publication "Product Engineering Bulletin," 1955, 251–368.